United States Patent [19]

Flaming

[11] Patent Number: 4,921,522
[45] Date of Patent: May 1, 1990

[54] METHOD AND APPARATUS FOR FORMING A MICROPIPETTE WITH UNIFORM APPLICATION OF HEAT

[76] Inventor: Dale G. Flaming, 2165-G Francisco Blvd., San Rafael, Calif. 94901

[21] Appl. No.: 377,044

[22] Filed: Jul. 10, 1989

Related U.S. Application Data

[63] Continuation-in-part of Ser. No. 342,177, Apr. 24, 1989, Pat. No. 4,869,745.

[51] Int. Cl.$^5$ ............................................... C03B 23/11
[52] U.S. Cl. ......................................... 65/108; 65/102; 65/105; 65/112; 65/270; 65/271; 65/283
[58] Field of Search ................. 65/102, 105, 112, 270, 65/283, 108, 271

[56] References Cited

U.S. PATENT DOCUMENTS

| | | | |
|---|---|---|---|
| 3,839,005 | 10/1974 | Meyer | 65/112 |
| 3,920,435 | 11/1975 | Curtis et al. | 65/108 X |
| 4,045,201 | 8/1977 | Caffarella et al. | 65/112 X |
| 4,146,380 | 3/1979 | Caffarella et al. | 65/270 X |
| 4,530,712 | 7/1985 | Kopf | 65/270 |
| 4,600,424 | 7/1986 | Flaming | 65/108 X |

*Primary Examiner*—Arthur Kellogg
*Attorney, Agent, or Firm*—Melvin R. Stidham

[57] ABSTRACT

The micropipette puller of this invention includes a pair of gripping jaws that pull a length of glass tubing in opposite directions. The source of heat is a laser device and a laser beam is directed against the glass tubing between the gripping jaws and beyond the tubing into a concave mirror, which reflects that portion of the beam that bypassed the tubing, back against the back side of the tubing for uniform heating around the circumference of the tubing.

3 Claims, 2 Drawing Sheets

METHOD AND APPARATUS FOR FORMING A MICROPIPETTE WITH UNIFORM APPLICATION OF HEAT

This is a continuation-in-part of my co-pending application Ser. No. 07/342,177 filed Apr. 24, 1989 now Patent No. 4,869,745 for "Apparatus for Forming Micropipette of Controlled Configuration by Moving the Point of Heat Application".

BACKGROUND OF THE INVENTION

This invention relates to micropipette pullers of the type shown in my earlier U.S. Pat. No. 4,600,424 granted July 15, 1986. Micropipette pullers generally employ a filament comprising a metal band or wire, which is bent into a ring to surround the glass tubing and then energized electrically to heat the tubing to its melting point. The heating capacity of such a filament is of course limited to the melting point of the metal from which the filament is formed and, therefore, in the aforesaid co-pending application, I introduced a laser device, which is not so limited, as the source of heat. However, in the apparatus there disclosed, the laser beam was directed against one side of the tubing, with the result that the opposite side of the tubing was not heated to the same extent. That is, the tubing was not heated uniformly around its circumferences.

OBJECTS OF THE INVENTION

It is an object of this invention to provide a micropipette puller with means for applying heat to the glass tubing uniformly around its circumference.

It is a further object of this invention to provide a micropipette puller capable of pulling a micropipette from materials of high melting point, such as quartz, by use of a laser beam.

It is a further object of this invention to provide a micropipette puller using a laser device as the source of heat, together with means for applying the heat uniformly on all sides of the tubing from which the micropipette is formed.

Other objects and advantages of this invention will become apparent from the description to follow, particularly when read in conjunction with the accompanying drawing.

SUMMARY OF THE INVENTION

In carrying out this invention, a tubing of glass, quartz or the like is pulled from both ends, initially by a weight carried on the ends of cables and then by a solenoid. A laser device directs a laser beam of width greater that the diameter of the tubing so that a portion of the beam is projected past the tubing, preferably on both sides. A concave mirror is positioned behind the tubing to reflect the sides of the laser beam back against the glass tubing and heat the back side of the tubing, so that the tubing is heated substantially uniformly around its circumference, thereby to improve the quality of the micropipette being pulled.

DESCRIPTION OF A PREFERRED EMBODIMENT

Figure 1:
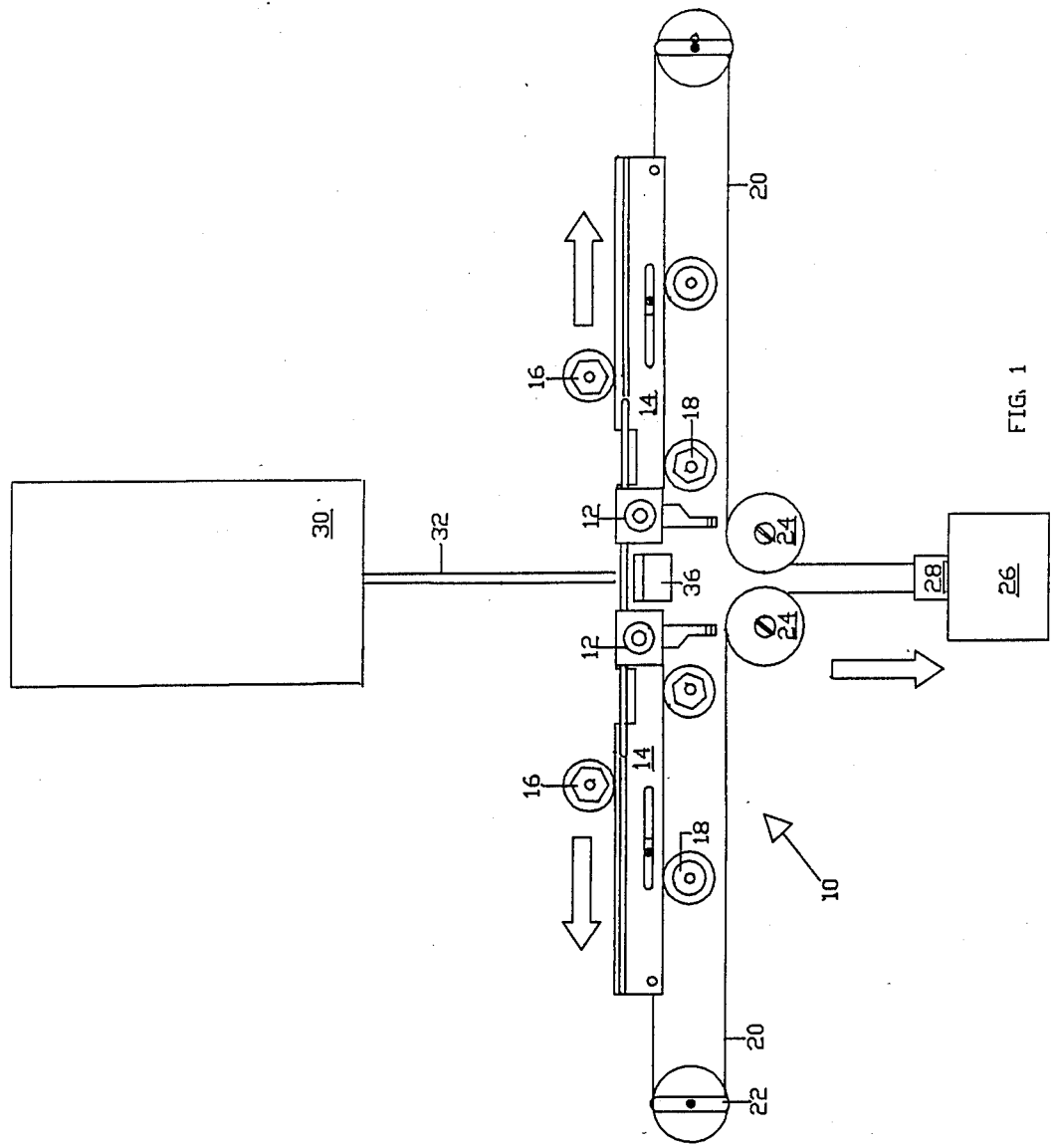
FIG. 1 is a schematic diagram of the apparatus of this invention for pulling a micropipette.

Referring now to FIG. 1 of the drawings with greater particularity, the micropipette puller 10 of this invention includes a pair of gripping jaws 12 on the adjacent ends of puller bars 14. The jaws 12 grip a tubing T of glass, quartz or the like to be pulled into the micropipette as heat is applied to the tubing to melt a portion thereof between the jaws.

The puller bars 14 roll along upper and lower roller bearings 16 and 18 and are pulled by cables 20, which extend over upper cable pulleys 22 and then back over closely spaced central lower pulleys 24 to suspend a solenoid 26. The solenoid 26 is capable of applying a light pull by application of its own weight, and then a stronger pull by actuation of the solenoid plunger 28. The source of heat in the micropipette puller 10 is a laser device 30 that projects a laser beam 32 onto a portion of the glass tubing T between the gripping jaws 12, to heat that portion to melting so that the micropipette can be pulled as desired.

The laser device 30 is not limited by its own melting point as in the case of a filament heater and it can melt materials of high melting point, such as quartz, which resonate at the wave length of a laser beam.

Figure 2:
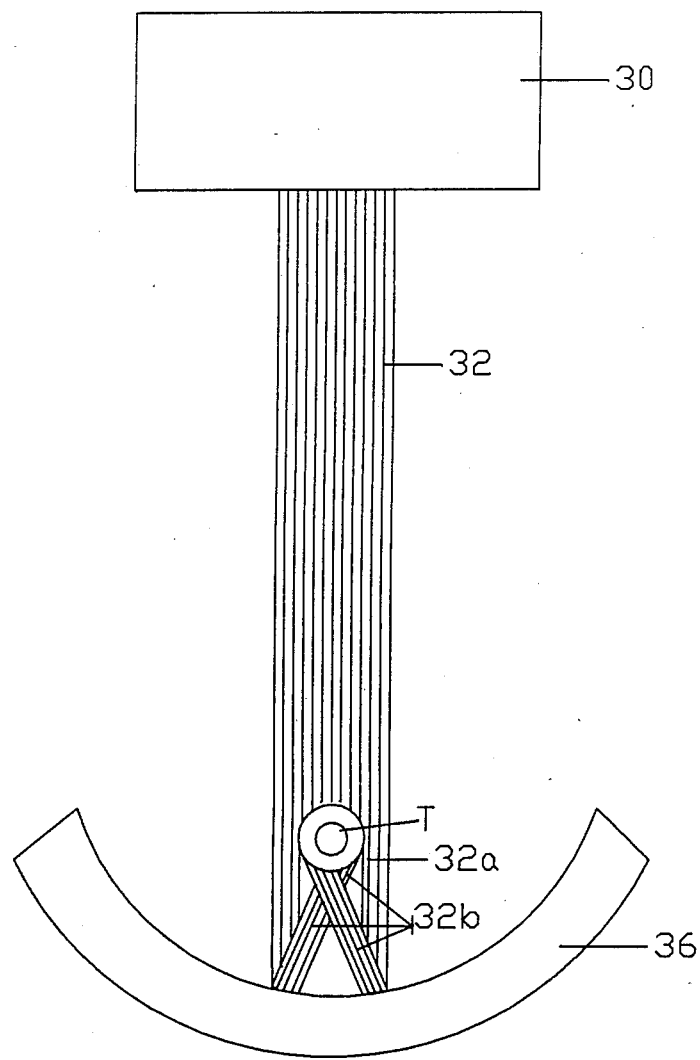
FIG. 2 is an enlarged schematic view of the micropipette tubing and a concave mirror, which comprises a component of the apparatus of FIG. 1.

Referring specifically to FIG. 2, there is disposed beyond the tubing T a concave mirror 36 that reflects a portion 32a of the laser beam 32 back at 32b against the far side of the tubing T so that the tubing T is heated relatively uniformly around its circumference. The mirror 36 may be cylindrically concave so that the tube T is heated on the far side along a selected length thereof; it may be spherically concave so that the reflected beam 32b is more nearly concentrated on a point; or it may be of other concave configuration depending on the length and configuration of the micropipette being pulled.

In any event, the laser beam 32 projected from the device 30 is somewhat wider than the thickness of the tubing T so that a portion of the beam 32a bypasses the tubing on both sides to impinge upon the concave mirror 36 directly. The tubing T is disposed at, or slightly ahead of, the focal point of the mirror 36.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A micropipette puller comprising:
   a pair of gripping members for gripping a length of glass tubing at spaced points along the length thereof;
   means for applying pulling forces to separate said gripping means;
   a laser device for directing a laser beam against the near side of a length of said tubing between said spaced points; and
   a concave mirror disposed beyond said tubing to reflect a portion of said beam against the far side of said length of tubing.

2. The micropipette puller defined by claim 1 wherein:
   said laser beam is wider than said tubing so that portions of said laser beam are directed past said tubing and directly against said concave mirror.

3. The method of pulling micropipettes comprising the steps of:
provide means for gripping a length of glass tubing at spaced points along the length thereof and applying forces to pull said gripping means apart;
providing a laser device for directing a laser beam;
providing a concave mirror and positioning same beyond a length of glass tubing held by said gripping means;
pulling said gripping means apart; and
directing a laser beam wider than said tubing against said length of said tubing so that a portion of said beam is reflected by said concave mirror back against the far side of said tubing.

* * * * *